(12) United States Patent
Alvarenga

(10) Patent No.: US 9,655,472 B1
(45) Date of Patent: May 23, 2017

(54) OPTIONALLY FUELED PORTABLE COOKING DEVICE

(71) Applicant: Jose G. Alvarenga, Munford, TN (US)

(72) Inventor: Jose G. Alvarenga, Munford, TN (US)

( * ) Notice: Subject to any disclaimer, the term of this patent is extended or adjusted under 35 U.S.C. 154(b) by 537 days.

(21) Appl. No.: 14/291,334

(22) Filed: May 30, 2014

(51) Int. Cl.
 *A47J 37/00* (2006.01)
 *A47J 37/07* (2006.01)

(52) U.S. Cl.
 CPC .................. *A47J 37/0763* (2013.01)

(58) Field of Classification Search
 CPC ............... A47J 37/0713; A47J 36/2477; A47J 37/0763; A47J 36/26; F24C 7/105; F24C 1/16; F24C 1/02
 See application file for complete search history.

(56) References Cited

U.S. PATENT DOCUMENTS

| 6,038,965 | A  | 3/2000 | Thorndyke |
| 6,257,227 | B1 | 7/2001 | Harbin    |
| 7,530,302 | B2 | 5/2009 | Stephanou |

*Primary Examiner* — Kenneth Rinehart
*Assistant Examiner* — Jason Lau
(74) *Attorney, Agent, or Firm* — Stevenson IP, LLC

(57) ABSTRACT

An optionally fueled portable cooking device having a hollow cylindrical body having an open top end and a perforated bottom end, a pair of opposed doors selectively disposed and movably meeting immediately adjacent the hollow cylindrical body, a disk-shaped base, an above-base ring having a plurality of spaced apart legs supporting the above-base ring, the above-base ring removably receiving the perforated bottom end, an ash pan removably disposed between the legs and upon the disc-shaped base, a grease pan for the grease tube, an electric plate removably disposed upon than L-shaped lip vertically disposed from the open top end, the electric plate having a power control and a plate grease drain, a gas fueled insert removably disposed within the hollow cylindrical body, and a perforated vent plate rotationally disposed below the perforated bottom end.

9 Claims, 6 Drawing Sheets

OPTIONALLY FUELED PORTABLE COOKING DEVICE

BACKGROUND OF THE INVENTION

Various types of portable cooking devices are known in the prior art. However, what is needed is an optionally fueled portable cooking device that provides easily changed heating sources that include solid fuels, gaseous fuels, and electricity. Another need is to provide such an optionally fueled portable cooking device that is cylindrical. Rectangular, square, and even kettle devices are known for not evenly and easily distributing heat to any items cooked. Additionally, the needed device should offer instant change of the heat source, and even a combination use of more than one heat source. Further, controlling heat through fresh air delivery has been too often done with small controls that freeze after limited use and even require lid removal to try to control fresh air delivery. Further, the device should provide for extreme ease of ash and grease removal, and such removal should be easily and openly accessed without any disassembly or significant internal invasion of the device. The present device meets these needs.

FIELD OF THE INVENTION

The present invention relates to portable cooking devices, and more particularly, to an optionally fueled portable cooking device that provides advantages not heretofore supplied to a user.

SUMMARY OF THE INVENTION

The general purpose of the present optionally fueled portable cooking device, described subsequently in greater detail, is to provide an optionally fueled portable cooking device that has many novel features that result in an optionally fueled portable cooking device which is not anticipated, rendered obvious, suggested, or even implied by prior art, either alone or in combination thereof.

To accomplish this, the optionally fueled portable cooking device comprises a hollow cylindrical body having an open top end and a perforated bottom end. The hollow cylindrical body is a critical design feature in that superior heat transfer is evenly distributed in cooking. An L-shaped lip is vertically disposed from the open top end. A pair of opposed doors is disposed immediately adjacent the outer wall and meet at an abutment. Each of the pair of doors includes a semi-circular cutout centrally disposed in the abutment. Each of the pair of doors further includes an outwardly extended vertical door pull disposed on each one of the pair of doors most distally from the abutment. The relatively large door pulls and the relatively large separation capable in the door design are both important features. Many cooking devises fail to design adequate opening access, if at all, to a heat source. Many cooking devices fail to provide for adequate leverage to open accesses, often resulting in frozen accesses due to smoke and cooking residue buildup.

A grease tube is disposed within and against the hollow cylindrical body and extends from the open top end through a tube opening in a perforated bottom end. A disk-shaped base is provided. An above-base ring has a plurality of spaced apart legs that are configured to support the above-base ring in a position atop the disc-shaped base. The above-base ring removably receives the perforated bottom end. The above-base ring includes a base ring drain for alignment with the grease tube. A grease pan is removably disposed upon the disc-shaped base below the grease tube. An ease of access to controlled grease drainage is another important design feature that is often overlooked in previous cooking devices. An ash pan is removably disposed between the legs and upon the disc-shaped base.

An electric plate is removably disposed upon the L-shaped lip. The electric plate has a power control. A plate grease drain is disposed within the electric plate and is selectively disposed directly above the grease tube. A gas fueled insert is removably disposed within the hollow cylindrical body. The gas fueled insert has a center stalk supporting an outlet plate. A gas inlet is removably fitted through the perforated bottom end and selectively attaches to an existing gas supply. A perforated vent plate with plate handle is rotationally disposed below the perforated bottom end. Plate holes of the vent plate are thereby selectively positioned below the perforated bottom end.

A lower base ring having a lower lip is provided. The lower base ring is supported by lower legs. The lower base ring and lower lip are in removable receipt of the disc-shaped base. The L-shaped lip and the lower lip are important features that prevent components from being dislodged, as cooking devices can become extremely hot, displacement of any major items thereby potentially being quite dangerous. An accessory plate is disposed between the lower legs.

Thus has been broadly outlined the more important features of the present optionally fueled portable cooking device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
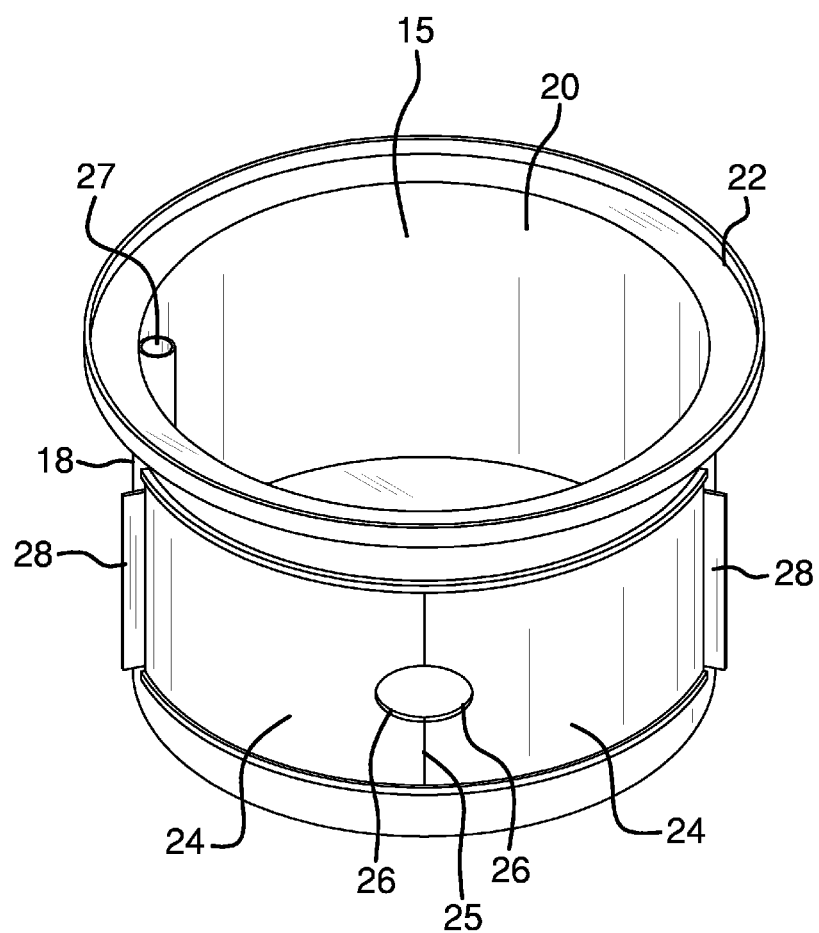
FIG. 1 is a perspective view of a hollow cylindrical body.
Figure 2:
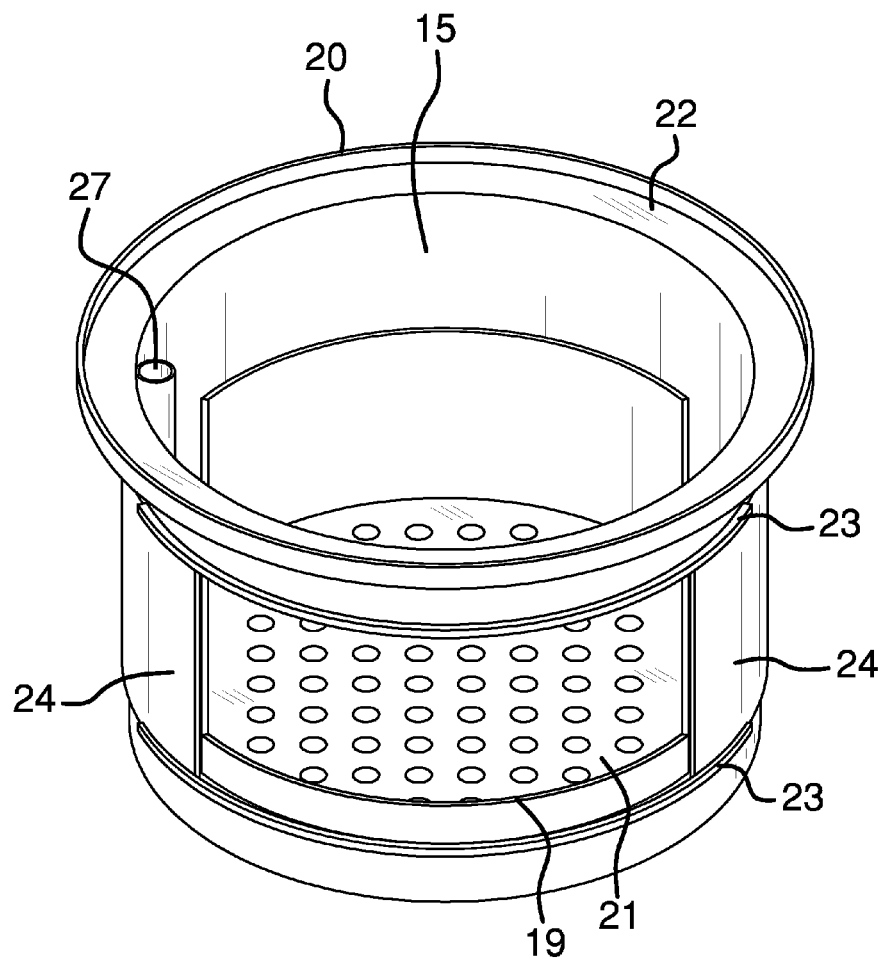
FIG. 2 is a perspective view of the hollow cylindrical body showing a pair of doors in an open position.
Figure 3:
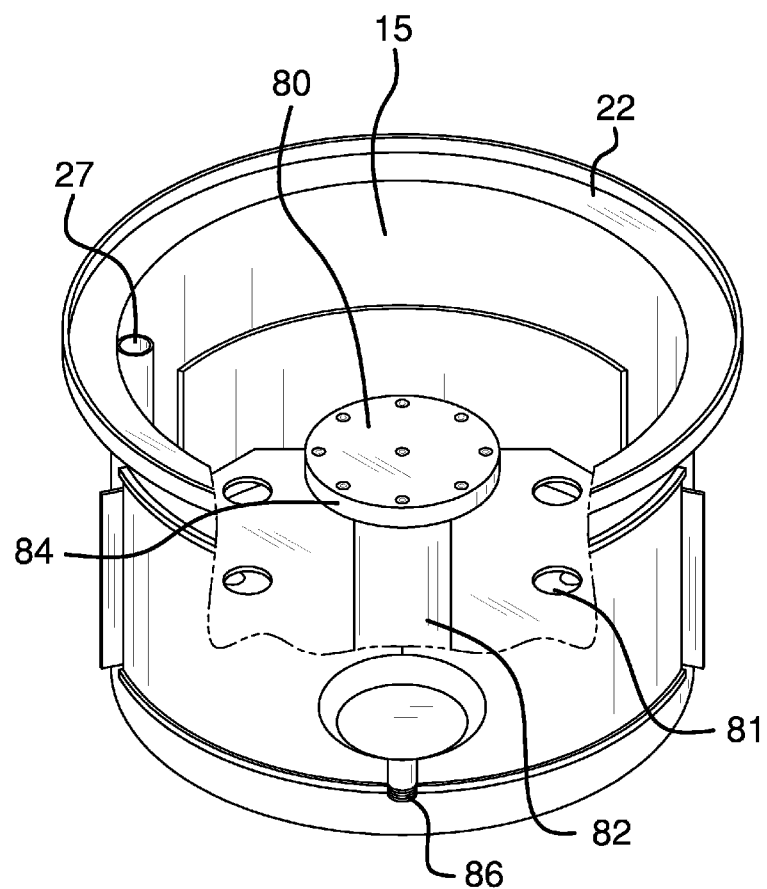
FIG. 3 is a perspective view of the hollow cylindrical body with a partial cutaway view showing a gas fuel insert.
Figure 4:
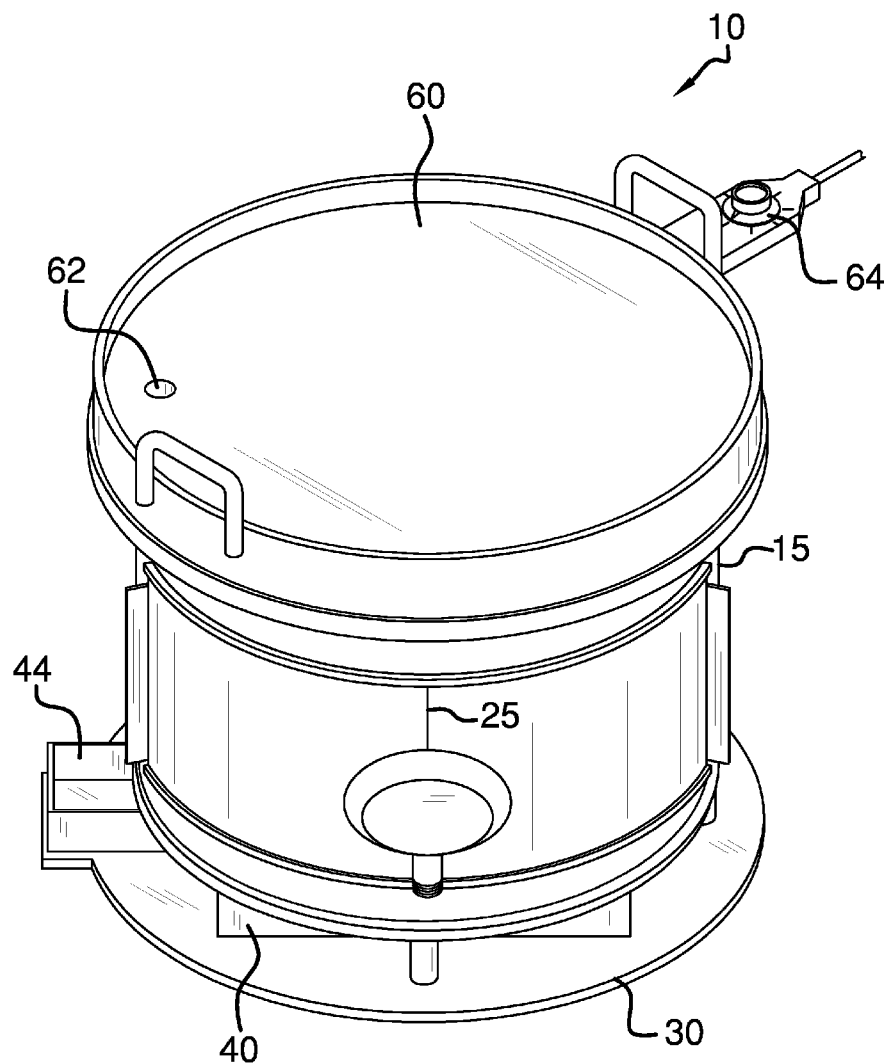
FIG. 4 is a perspective view of an electric plate in a position atop the hollow cylindrical body.
Figure 5:
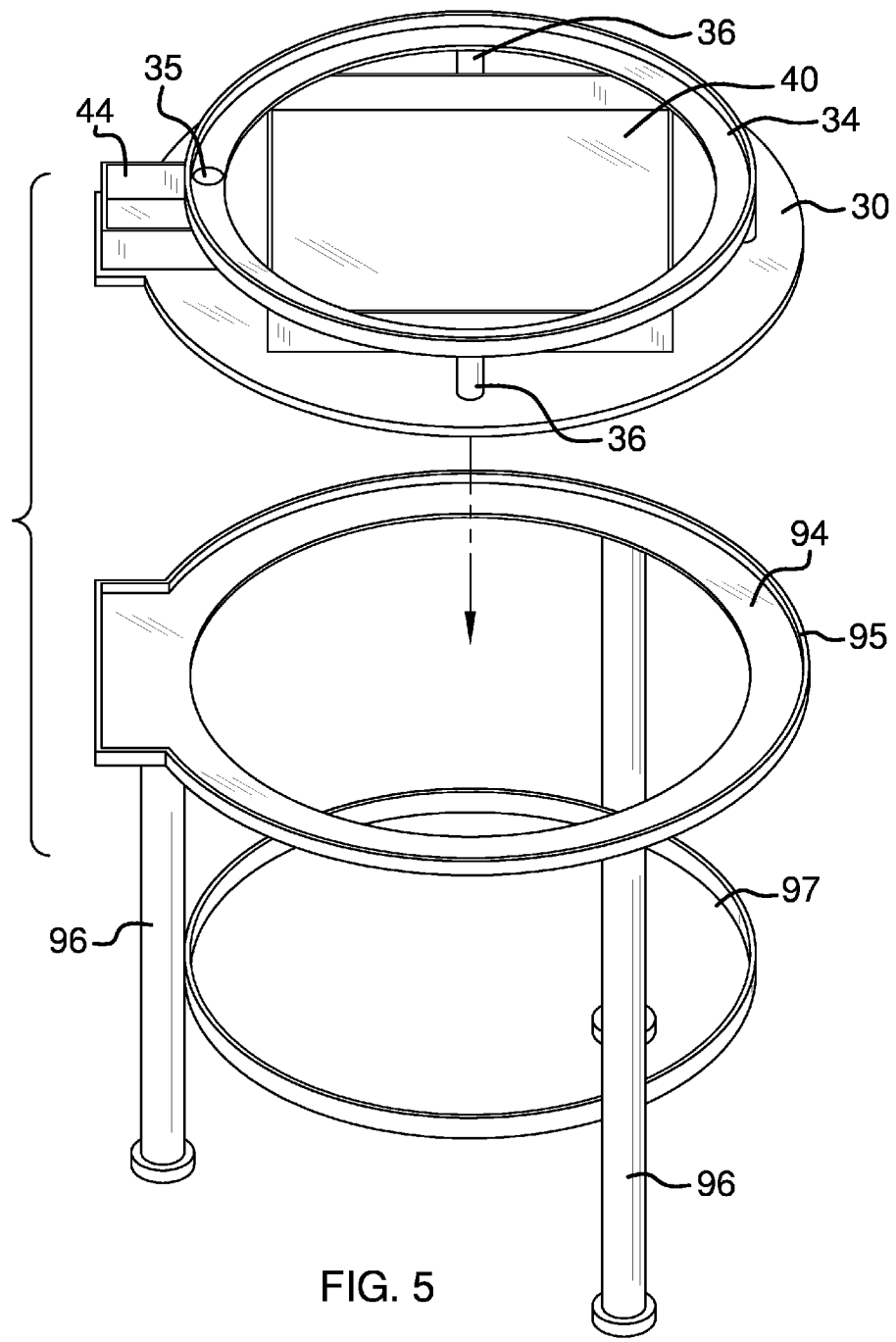
FIG. 5 is an exploded perspective view of a disc-shaped base, a plurality of support rings supporting an above-base ring, and an accessory lower base ring supported with a plurality of lower legs.
Figure 6:
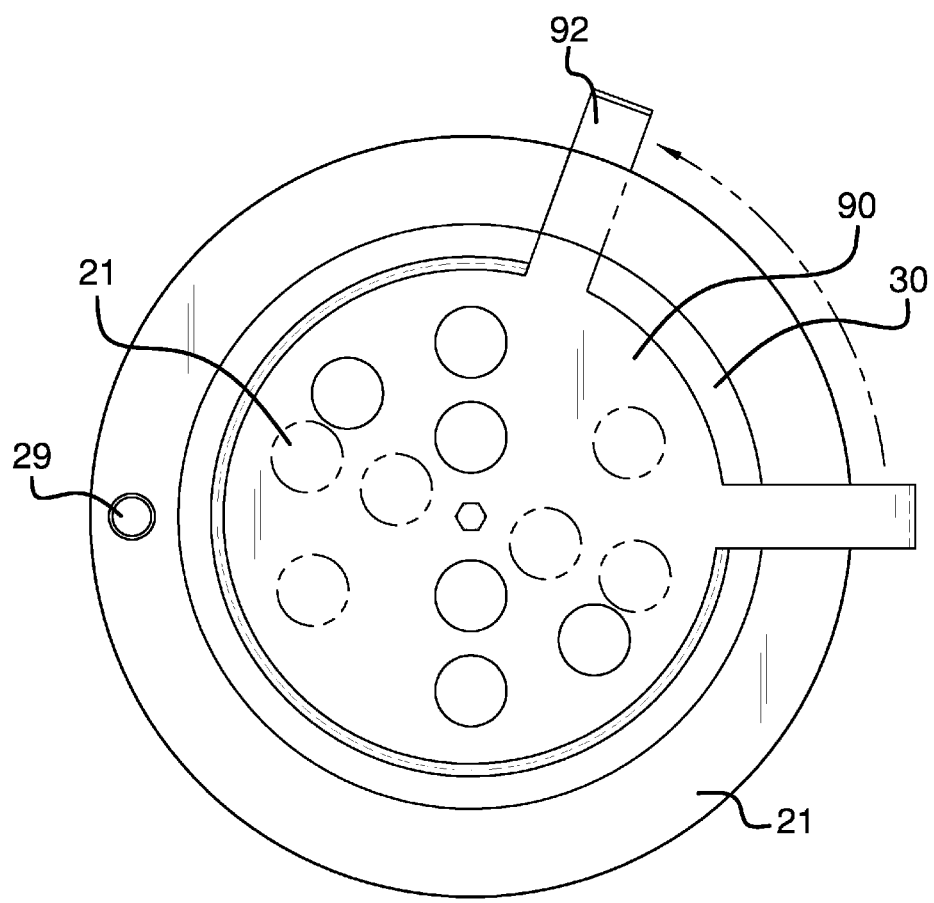
FIG. 6 is a top plan view of a perforated vent plate.

With reference now to the drawings, and in particular FIGS. 1 through 6 thereof, an example of the optionally fueled portable cooking device employing the principles and concepts of the present optionally fueled portable cooking device and generally designated by the reference number 10 will be described.

Referring to FIGS. 1 through 6, the optionally fueled portable cooking device 10 is illustrated. The optionally fueled portable cooking device 10 comprises a hollow cylindrical body 15 having an open top end 20, a perforated bottom end 21, an outer wall 18 disposed there between, and a gap 19 within a portion of the outer wall 18, the gap comprising a 90 degree area within the inherent 360 degrees of the outer wall. An L-shaped lip 22 is vertically disposed from the open top end 20. A pair of tracks 23 is horizontally disposed along a portion of the outer wall 18 directly adjacent the gap 18 in each of a position between the gap 19 and the bottom end 21 and between the L-shaped lip 22 and the gap 19. A pair of opposed doors 24 is disposed immediately adjacent the outer wall 18 directly adjacent the gap. The pair of doors 24 movably engage the tracks 23 and meet at an abutment 25 in a closed position. Each of the doors 24 includes a semi-circular cutout 26 centrally disposed in the abutment 25, the semi-circular cutouts 26 being mirror images. Each of the pair of doors 24 further comprises an outwardly extended vertical door pull 28 disposed on each one of the pair of doors 24 most distally from the abutment 25.

A grease tube 27 is disposed within and immediately adjacent the hollow cylindrical body 15 and extends from the open top end 20 through perforated bottom end 21 via the tube opening 29. A disk-shaped base 30 is provided. An above-base ring 34 has a plurality of spaced apart legs 36 that are configured to support the above-base ring 34 in a position atop the disc-shaped base 30. The above-base ring 34 is removably in receipt of the perforated bottom end 21. The above-base ring 34 comprises a base ring drain 35 for alignment with the grease tube 27. An ash pan 40 is removably disposed between the legs 36 and upon the disc-shaped base 30. A grease pan 44 is removably disposed upon the disc-shaped base 30 below the grease tube 27.

An electric plate 60 is removably disposed upon the L-shaped lip 22. The electric plate 60 has a power control 64. A plate grease drain 62 is disposed within the electric plate 60 and is selectively disposed directly above the grease tube 27. A gas fueled insert 80 is removably disposed within the hollow cylindrical body 15. The gas fueled insert 80 has a center stalk 82 supporting an outlet plate 84. A plurality of insert perforations 81 is disposed within the gas fueled insert. A gas inlet 86 is removably fitted through the perforated bottom end 21 and selectively attaches to an existing gas supply. A perforated vent plate 90 with plate handle 92 is rotationally and immediately disposed below the perforated bottom end 21. Plate holes 91 of the vent plate 90 are thereby selectively positioned below the perforated bottom end 21.

A lower base ring 94 having a lower lip 95 is provided. The lower base ring 94 is supported by lower legs 96. The lower base ring 94 and lower lip 95 are in removable receipt of the disc-shaped base 30. An accessory plate is disposed between the lower legs 96.

What is claimed is:

1. An optionally fueled portable cooking device comprising:
    a hollow cylindrical body having an open top end, a perforated bottom end, an outer wall disposed between the open top end and the bottom end, and a gap within a portion of the outer wall;
    a tube opening in the perforated bottom end;
    a pair of tracks horizontally disposed along a portion of the outer wall directly adjacent the gap in each of a position between the L-shaped lip and the gap and between the gap and the bottom end;
    a pair of doors immediately adjacent the outer wall directly adjacent the gap, the doors movably engaging the tracks, wherein the doors meet at an abutment in a closed position, each of the doors including a semi-circular cutout centrally disposed in the abutment, the semi-circular cutouts being mirror images;
    a grease tube disposed within and immediately the hollow cylindrical body, the grease tube extended from the open top end through tube opening;
    an outwardly extended vertical door pull disposed on each door;
    a disk-shaped base;
    an above-base ring having a plurality of spaced apart legs, the legs configured to support the above-base ring in a position atop the disc-shaped base and a base ring drain, the above-base ring configured to removably receive the perforated bottom end;
    an ash pan removably disposed between the legs and upon the disc-shaped base;
    a grease pan removably disposed upon the disc-shaped base below the grease tube; and
    a gas fueled insert removably disposed within the hollow cylindrical body, the gas fueled insert having a center stalk supporting an outlet plate and a gas inlet removably fitted through the perforated bottom end.

2. The device of claim 1 wherein the gap comprises a 90 degree area of the 360 degree hollow cylindrical body.

3. The device of claim 1 wherein each of the pair of doors has an opposed semi-circular cutout, the semi-circular cutouts selectively meeting at an abutment.

4. The device of claim 1 wherein a perforated vent plate is rotationally disposed immediately below the perforated bottom end.

5. The device of claim 2 wherein each of the pair of doors has an opposed semi-circular cutouts, the semi-circular cutouts selectively meeting at an abutment.

6. The device of claim 2 wherein a perforated vent plate is rotationally disposed below the perforated bottom end.

7. The device of claim 3 wherein a perforated vent plate is rotationally and immediately disposed below the perforated bottom end.

8. The device of claim 5 wherein a perforated vent plate rotationally and immediately disposed below the perforated bottom end.

9. An optionally fueled portable cooking device comprising:
    a hollow cylindrical body having an open top end, a perforated bottom end, an outer wall disposed between the open top end and the bottom end, and a gap within a portion of the outer wall;
    an L-shaped lip vertically disposed from the open top end;
    a tube opening in the perforated bottom end;
    a pair of tracks horizontally disposed along a portion of the outer wall directly adjacent the gap in each of a position between the gap and the bottom end and between the L-shaped lip and the gap;
    a pair of opposed doors is selectively disposed and movably meeting immediately adjacent the hollow cylindrical body, each of the pair of doors having and opposed semi-circular cutout, the semi-circular cutouts selectively meeting at an abutment;
    a grease tube disposed within and against the hollow cylindrical body, the grease tube extended from the open top end through perforated bottom end;
    an outwardly extended vertical door pull disposed on each door;
    a disk-shaped base;
    an above-base ring having a plurality of spaced apart legs, the legs configured to support the above-base ring in a position atop the disc-shaped base and a base ring drain, the above-base ring configured to removably receive the perforated bottom end;
    an ash pan removably disposed between the legs and upon the disc-shaped base;
    a grease pan removably disposed upon the disc-shaped base below the grease tube;
    an electric plate removably disposed upon the L-shaped lip, the electric plate having a power control and a plate grease drain, the plate grease drain selectively disposed directly above the grease tube;
a gas fueled insert removably disposed within the hollow cylindrical body, the gas fueled insert having a center stalk supporting an outlet plate and a gas inlet removably fitted through the perforated bottom end;
a plurality of insert perforations disposed within the gas fueled insert;
a perforated vent plate rotationally disposed below the perforated bottom end;
a lower base ring having a lower lip and a plurality of lower legs, the lower base ring in removable receipt of the disc-shaped base; and
an accessory plate disposed between the lower legs.

* * * * *